(12) United States Patent
Wang et al.

(10) Patent No.: US 9,272,943 B2
(45) Date of Patent: Mar. 1, 2016

(54) MEDIUM TEMPERATURE SOLID FUEL CELL GLASS PACKAGING MATERIAL

(71) Applicant: National Taipei University of Technology, Taipei (TW)

(72) Inventors: Sea-Fue Wang, Taipei (TW); Yueh-Chi Hsieh, Tainan (TW); Yung-Fu Hsu, New Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 14/103,580

(22) Filed: Dec. 11, 2013

(65) Prior Publication Data

US 2015/0158755 A1 Jun. 11, 2015

(51) Int. Cl.
| | | |
|---|---|---|
| *C03C 3/062* | (2006.01) | |
| *C03C 12/00* | (2006.01) | |
| *C03C 8/24* | (2006.01) | |
| *H01M 8/00* | (2006.01) | |
| *H01M 8/02* | (2006.01) | |
| *H01M 8/12* | (2006.01) | |

(52) U.S. Cl.
CPC . *C03C 3/062* (2013.01); *C03C 8/24* (2013.01); *C03C 12/00* (2013.01); *H01M 8/00* (2013.01); *H01M 8/0282* (2013.01); *H01M 2008/1293* (2013.01)

(58) Field of Classification Search
CPC . C03C 3/00–3/328; C03C 8/24; C03C 12/00; H01M 8/00
USPC .............................. 501/64, 73–79
See application file for complete search history.

(56) References Cited

U.S. PATENT DOCUMENTS

| | | | | |
|---|---|---|---|---|
| 3,811,901 | A * | 5/1974 | Bacon .............................. | 501/38 |
| 4,824,809 | A * | 4/1989 | Grabowski et al. ............. | 501/75 |
| 5,273,837 | A * | 12/1993 | Aitken et al. .................. | 429/496 |
| 5,747,397 | A * | 5/1998 | McPherson et al. ............ | 501/51 |
| 6,816,235 | B2 * | 11/2004 | Kido et al. ...................... | 355/67 |
| 7,008,891 | B2 * | 3/2006 | Kobayashi et al. ............... | 501/6 |
| 7,291,571 | B2 * | 11/2007 | Sprenger et al. .................. | 501/9 |
| 7,670,978 | B2 * | 3/2010 | Kasuga et al. ................... | 501/78 |
| 2006/0019813 | A1 * | 1/2006 | Yoshii .............................. | 501/15 |
| 2006/0019815 | A1 * | 1/2006 | Inoue et al. ...................... | 501/72 |
| 2006/0247119 | A1 * | 11/2006 | Ritter et al. ..................... | 501/78 |
| 2008/0318758 | A1 * | 12/2008 | Imakita et al. .................. | 501/51 |
| 2009/0105061 | A1 * | 4/2009 | Fujiwara et al. ................ | 501/78 |

OTHER PUBLICATIONS

Shouguo Huang, Qiliang Lu, Chunchang Wang, Y2O3—BaO—SiO2—B2O3—Al2O3 glass sealant for solid oxide fuel cells, Journal of Alloys and Compounds 509 (2011) 4348-4351.

* cited by examiner

*Primary Examiner* — Anthony J Green
*Assistant Examiner* — Elizabeth A Bolden
(74) *Attorney, Agent, or Firm* — Ming Chow; Sinorica, LLC

(57) ABSTRACT

A medium temperature solid oxide fuel cell glass packaging material is provided. The glass packaging material may include a glass main body made of $SiO_2$, $Al_2O_3$, $Y_2O_3$ and ZnO, and at least one glass modifier added into the glass main body. Glass transition temperature ranges from 700 to 900 degrees Celsius. The glass modifier may be rare earth elements or transitory elements. The added glass modifier may adjust the glass transition temperature and the thermal expansion coefficient, and improve the bonding characteristics of the glass packaging material, so as to allow the manufactured glass packaging material to be applicable in SOFC application temperature range from 500 to 800 degrees Celsius.

7 Claims, 11 Drawing Sheets

Unit: mol%

| YAS1-sys. | SiO₂ | Al₂O₃ | Y₂O₃ | ZnO | La₂O₃ | Nd₂O₃ | K₂O |
|---|---|---|---|---|---|---|---|
| YASZL1 | 40.0 | 16.0 | 12.0 | 20.0 | 12.0 | - | - |
| YASZN1 | 40.0 | 16.0 | 12.0 | 20.0 | - | 12.0 | - |
| YASK1-sys. | SiO₂ | Al₂O₃ | Y₂O₃ | ZnO | La₂O₃ | Nd₂O₃ | K₂O |
| YASZLK1 | 40.0 | 16.0 | 12.0 | 20.0 | 6.0 | - | 6.0 |
| YASZNK1 | 40.0 | 16.0 | 12.0 | 20.0 | - | 6.0 | 6.0 |
| YASN1-sys. | SiO₂ | Al₂O₃ | Y₂O₃ | ZnO | La₂O₃ | Nd₂O₃ | NiO |
| YASZLN1 | 40.0 | 16.0 | 8.0 | 20.0 | 12.0 | - | 4.0 |
| YASZLN4 | 42.0 | 16.0 | 6.0 | 20.0 | 12.0 | - | 4.0 |

| YAS1-sys. | CTE (×10⁻⁶/°C) | $T_g$ (°C) | $T_{ds}$ (°C) |
|---|---|---|---|
| YASZL1 | 8.35 | 768 | 817 |
| YASZN1 | 7.25 | 763 | 799 |
| YASK1-sys. | CTE (×10⁻⁶/°C) | $T_g$ (°C) | $T_{ds}$ (°C) |
| YASZLK1 | 8.15 | 740 | 811 |
| YASZNK1 | 7.92 | 742 | 792 |
| YASN1-sys. | CTE (×10⁻⁶/°C) | $T_g$ (°C) | $T_{ds}$ (°C) |
| YASZLN1 | 8.43 | 745 | 789 |
| YASZLN4 | 7.57 | 748 | 794 |

| YAS1- sys. | YASZL1 | YASZN1 |
|---|---|---|
| $T_c$ (°C) | 934 | 993 |
| YASK1- sys. | YASZLK1 | YASZNK1 |
| $T_c$ (°C) | 884 | 879 |
| YASN1- sys. | YASZLN1 | YASZLN4 |
| $T_c$ (°C) | 969 | 973 |

MEDIUM TEMPERATURE SOLID FUEL CELL GLASS PACKAGING MATERIAL

BACKGROUND

1. Technical Field

The present disclosure relates to medium temperature solid fuel cell glass packaging material, in particular, to glass packaging material using Si—Al—Y—Zn as a glass main body with at least one glass modifier added, for increasing the thermal expansion coefficient and improving the bonding characteristics of the glass packaging material which therefore could be applied in other high temperature packaging environment.

2. Description of Related Art

In the fuel cell technology field, solid oxide fuel cells (SOFC) are associated with higher energy transfer efficiency, could select from multiple fuel sources, and are of the relatively lowered manufacturing costs. That said, SOFC needs to operate at high operating temperatures such as the range between 600 and 800 degrees Celsius. In the plate-type SOFC, therefore, high temperature packaging becomes necessary for filling the gap between the plates by the packaging material, in order to isolate the fuel gas from the oxygen. In short, the packaging material is used for bonding the materials/components and ensuring the air-tight SOFC with respect to its surrounding environment.

In a paper written by Shouguo Huang et al. and published in Journal of Alloys and Compounds, Si—AL—Y—Ba—B glass has been proposed. Such glass is made of $SiO_2$ (3.53 wt % and 6.97 mol %), $Al_2O_3$ (7.21 wt % and 8.39 mol %), $Y_2O_3$ (10 wt % and 5.27 mol %), BaO (60 wt % and 46.55 mol %), and $B_2O_3$ (19.26 wt % and 32.83 mol %). As previously mentioned, SOFC needs to be operating in the high-temperature environment (such as in the temperature range between 600 and 800 degrees Celsius), and therefore the usage of the alkaline earth elements and the connecting members between the components of the fuel cell together could generate compounds such as $MgCrO_4$, $Ba_3CaSi_2O_8$, $BaCrO_4$, $MgSiO_3$ and $Mg_2Al_4Si_5O_{18}$ causing the changes to the expansion coefficients and thus the rifts between the electrolyte and the connecting members. And the alkaline earth element itself is likely to produce the compound when reacting with the cathode, increasing the battery resistivity of the fuel cell. Despite the addition of $B_2O_3$ could reduce the viscosity and increase the wet-ability, $B_2O_3$ could be subject to volatility because of its low melting point and could produce $HBO_2$ and $B(OH)_3$ in reduction environment.

However, most of the published research papers continue their use the alkaline earth elements or boron as the glass modifier, which may not be suitable in the glass packaging material in the SOFC applications that are used in the high temperature environment for the extended period of time.

In addition, the conventional glass packaging material when used in the solid oxide fuel cell may be resulting in the inter-diffusion among the connecting members and the components, which in turn could diminish the packaging capability after the extended use. Therefore, while overcoming the above problem, and ensure the applicability of the glass packaging material in the SOFC applications without lead, boron, and alkaline earth elements and excluding the mixture with ceramic powder the present disclosure could still serve the packaging function in the 600-800-degree Celsius temperature range.

SUMMARY OF THE DISCLOSURE

The present disclosure is to provide the medium temperature solid state oxide fuel cell glass packaging material applicable in the SOFC applications without the addition of lead, boron, and alkaline earth elements and excluding the mixture with the ceramic powder gel cushion system and serving the purpose of packaging in the 500-800 degree Celsius range.

The present disclosure is to provide the medium temperature solid state oxide fuel cell glass packaging material capable of having its softening point and the expansion coefficient to control the extent of the fluidity of the glass packaging material and therefore avoid the overflow of the glass packaging material into other components, which minimize the occurrence of the contamination of the components.

The medium temperature solid oxide fuel cell glass packaging material includes a glass main body made of $SiO_2$, $Al_2O_3$, $Y_2O_3$ and ZnO, and at least one glass modifier added into the glass main body for manufacturing the glass packaging material. A glass transition temperature ranges from 700 to 900 degrees Celsius such as 700, 710, 720, 730, 740, 750, 760, 770, 780, 790, 800, 810, 820, 830, 840, 850, 860, 870, 880, 890, or 900 degrees Celsius.

Specifically, $SiO_2$, $Al_2O_3$, $Y_2O_3$ and ZnO in the glass main body are obtained from oxides, metal hydroxides, carbonates, sulfates or nitrates.

Specifically, $SiO_2$, $Al_2O_3$ account for 45.0 to 65.0 mol % of the glass packaging material.

Specifically, Si and Al account for 20 to 50 wt % of SiO2 and Al2O3, respectively.

Specifically, $Y_2O_3$ is for adjusting an expansion coefficient of the glass main body, and accounts for 6.0 to 24.0 mol % of the glass packaging material.

Specifically, Y accounts for 10 to 45 wt % of $Y_2O_3$.

Specifically, ZnO is for adjusting the glass transition temperature, a softening point and a glass crystallization temperature of the glass main body while accounting for 10.0 to 25.0 mol % of the glass packaging material.

Specifically, Zn accounts for 15 to 35 wt % of ZnO.

Specifically, the glass modifier is $La_2O_3$ for adjusting a thermal expansion coefficient of the glass packaging material and $La_2O_3$ accounts for 4.0 to 18.0 mol % of the glass packaging material.

Specifically, La accounts for 12 to 45 wt % of $La_2O_3$.

Specifically, $La_2O_3$ is obtained from oxides, metal hydroxides, carbonates, sulfates or nitrates.

Specifically, the glass modifier is $Nd_2O_3$ for adjusting a thermal expansion coefficient of the glass packaging materials and $Nd_2O_3$ accounts for 4.0 to 18.0 mol % of the glass packaging material.

Specifically, Nd accounts for 12 to 45 wt % of $Nd_2O_3$.

Specifically, $Nd_2O_3$ is obtained from oxides, metal hydroxides, carbonates, sulfates or nitrates.

Specifically, the glass modifier is $K_2O$ for adjusting the glass transition temperature and bonding characteristics of the glass packaging material, and $K_2O$ accounts for 4.0 to 18.0 mol % of the glass packaging material.

Specifically, K accounts for 4 to 15 wt % of $K_2O$.

Specifically, $K_2O$ is obtained from oxides, metal hydroxides, carbonates, sulfates or nitrates.

Specifically, the glass modifier is NiO for adjusting the glass transition temperature and bonding characteristics of the glass packaging material, and NiO accounts for 4.0 to 18.0 mol % of the glass packaging material.

Specifically, Ni accounts for 4 to 15 wt % of NiO.

Specifically, NiO is obtained from oxides, metal hydroxides, carbonates, sulfates or nitrates.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DESCRIPTION OF THE EXEMPLARY EMBODIMENTS

Figures 1, 2A:
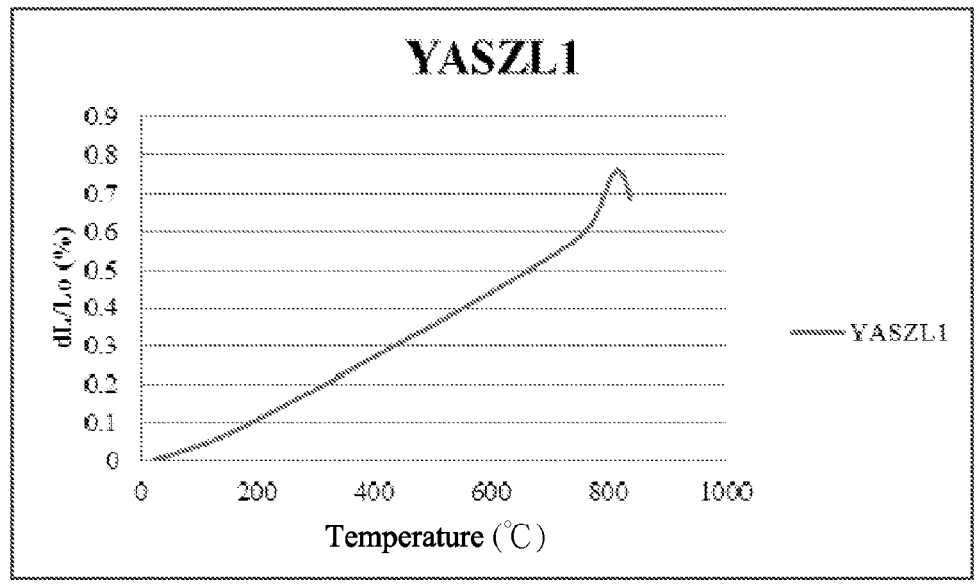
FIG. 1 shows a combination of composing materials for manufacturing the medium temperature solid oxide fuel cell glass packaging material according to one embodiment of the present disclosure.
FIGS. 2A-2F show thermal expansion coefficient curves of the glass packaging materials of different combinations of composing materials according to one embodiment of the present disclosure.
Figure 2B:
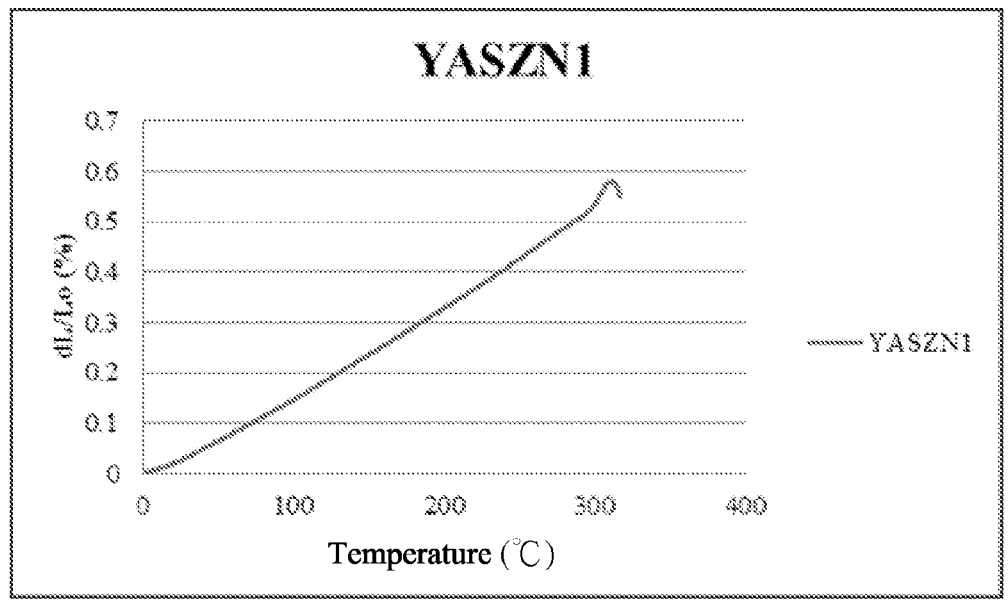
Figure 2C:
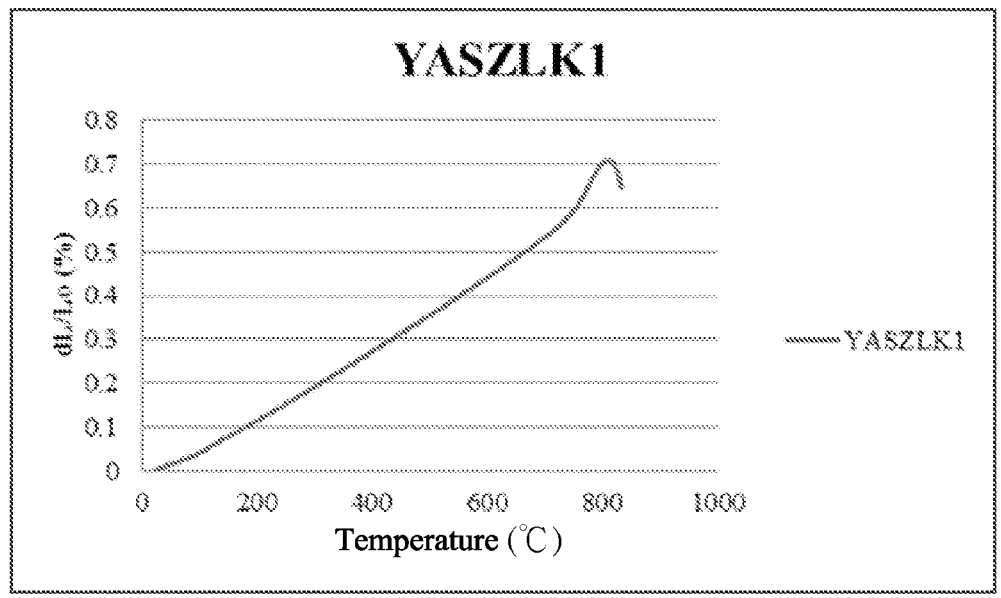
Figure 2D:
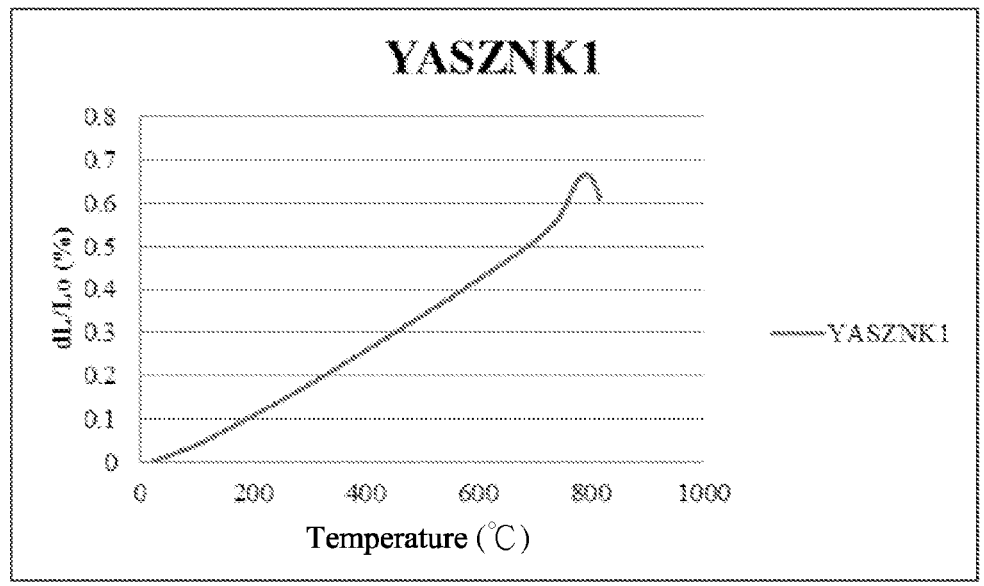
Figure 2E:
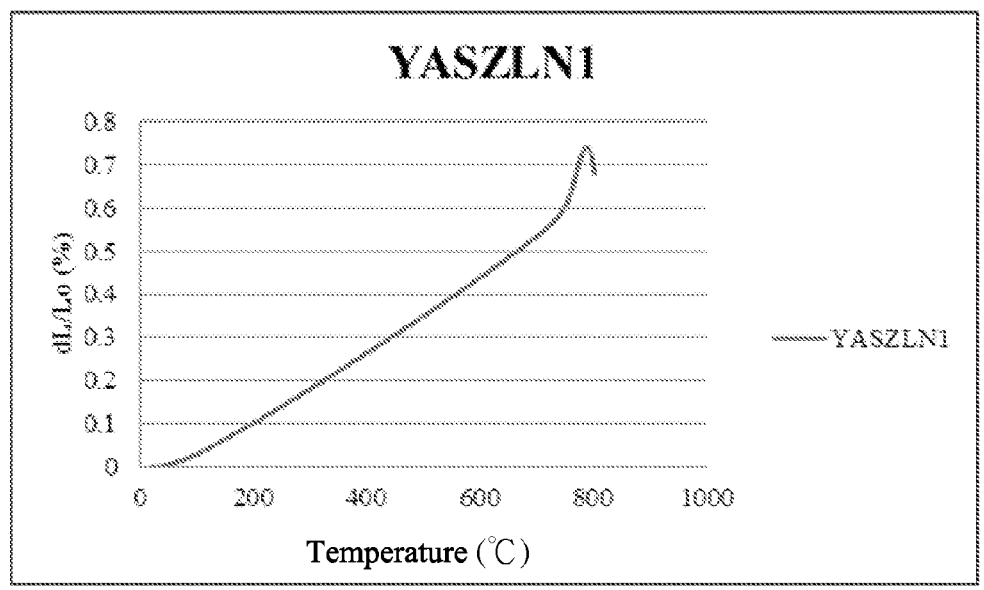
Figures 2F, 3:
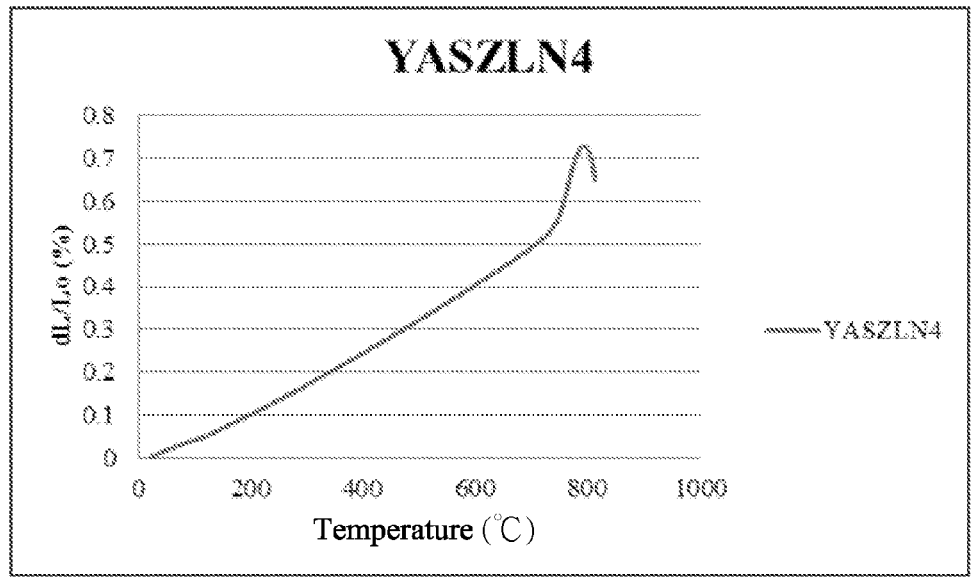
FIG. 3 shows data of the thermal expansion coefficients, glass transition temperatures, softening temperatures of the glass packaging materials of different combinations of the composing materials according to one embodiment of the present disclosure.
Figure 4A:
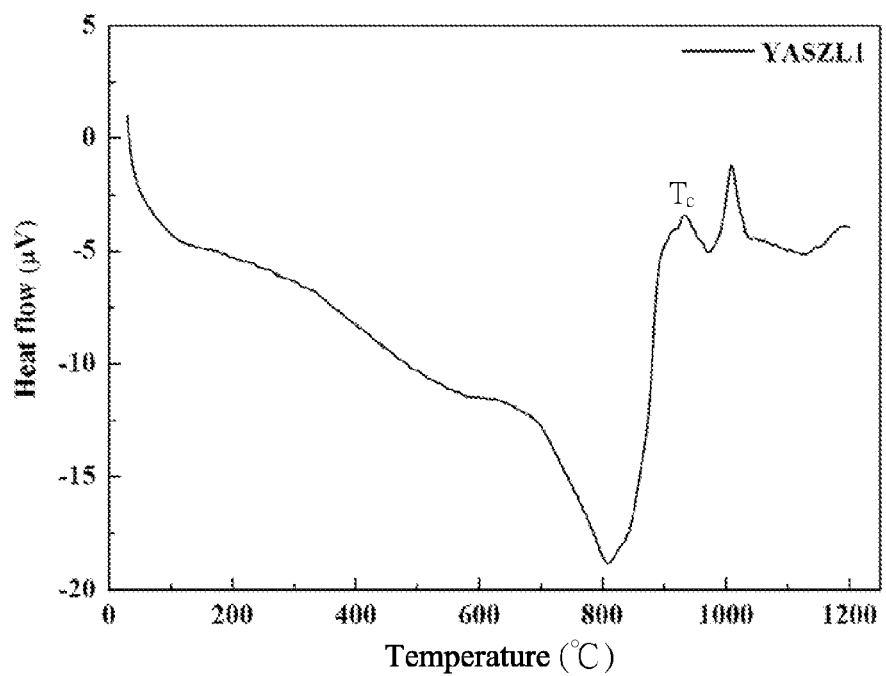
FIGS. 4A-4F show curves of glass differential thermal analysis (DTA) for the glass packaging materials of different combinations of the composing materials according to one embodiment of the present disclosure.
Figure 4B:
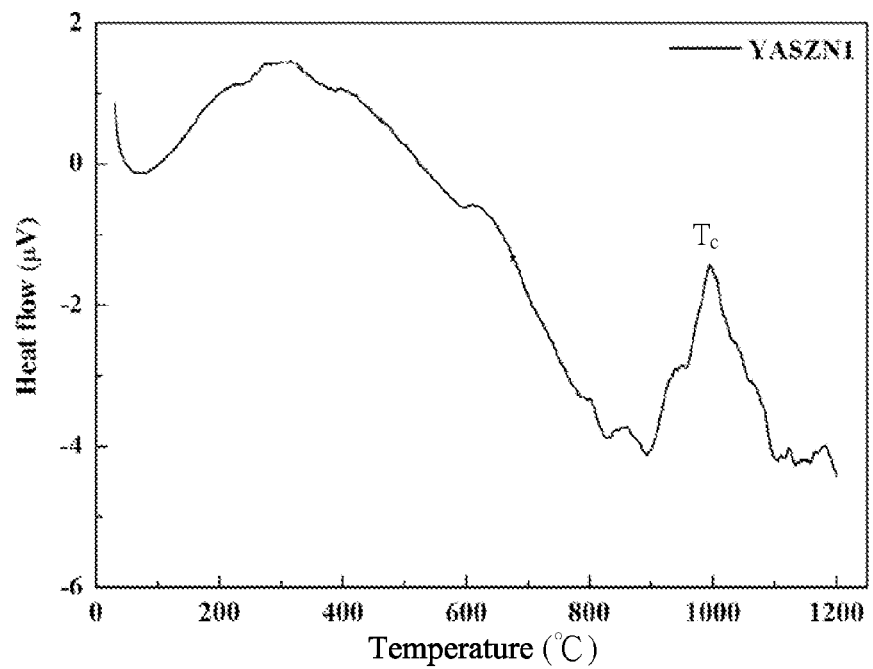
Figure 4C:
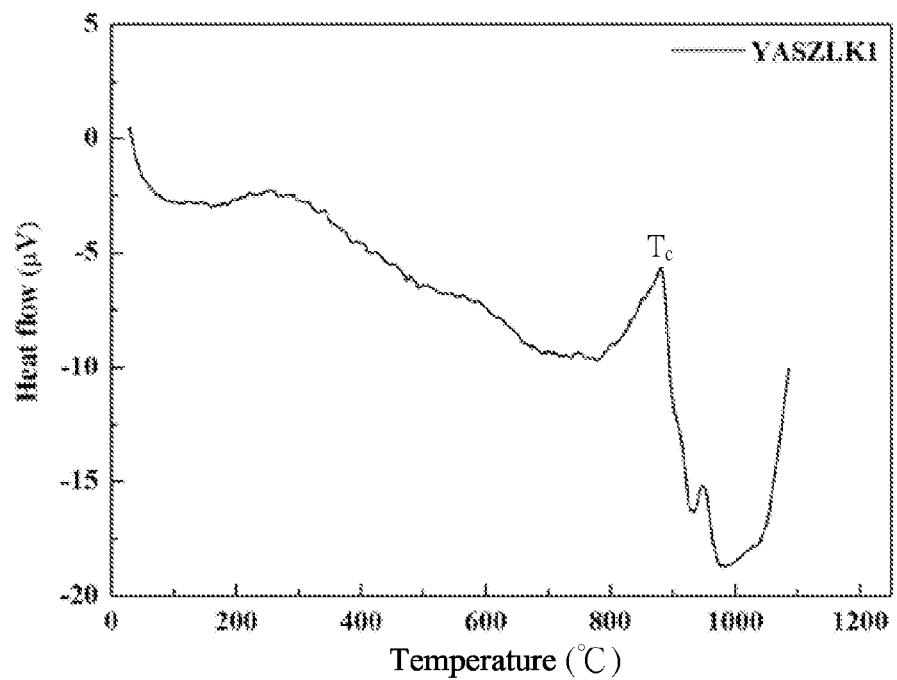
Figure 4D:
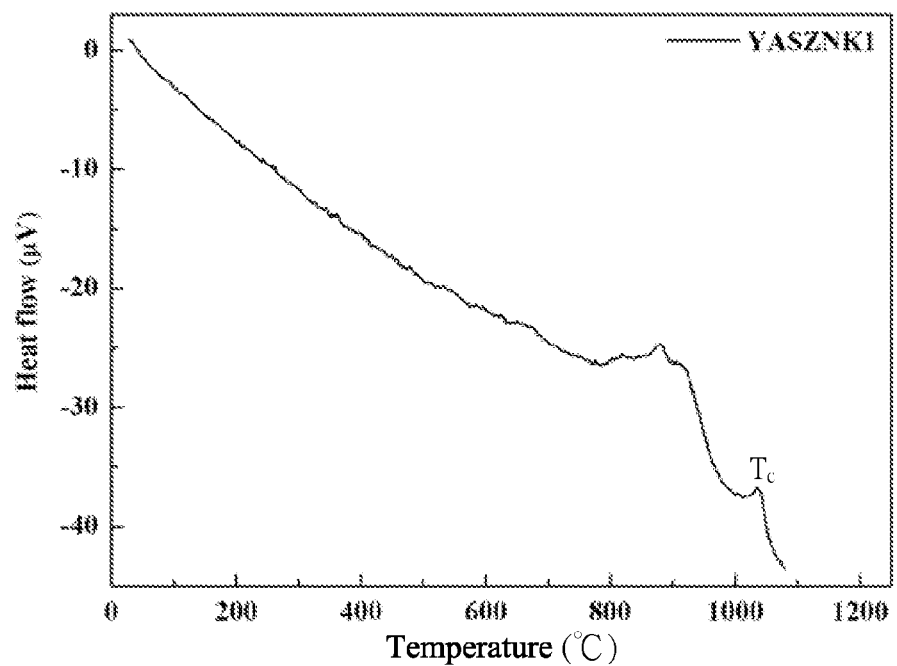
Figure 4E:
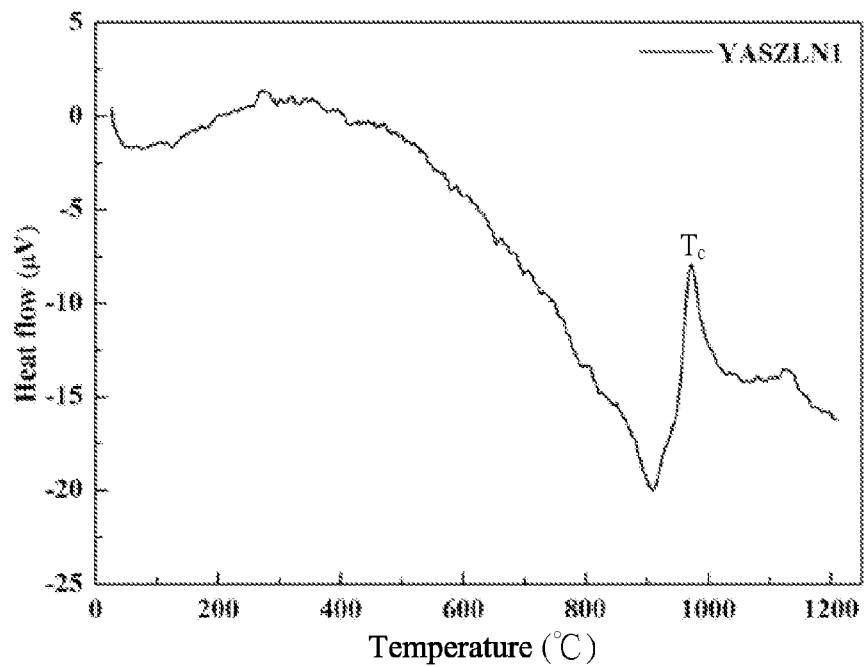
Figure 4F:
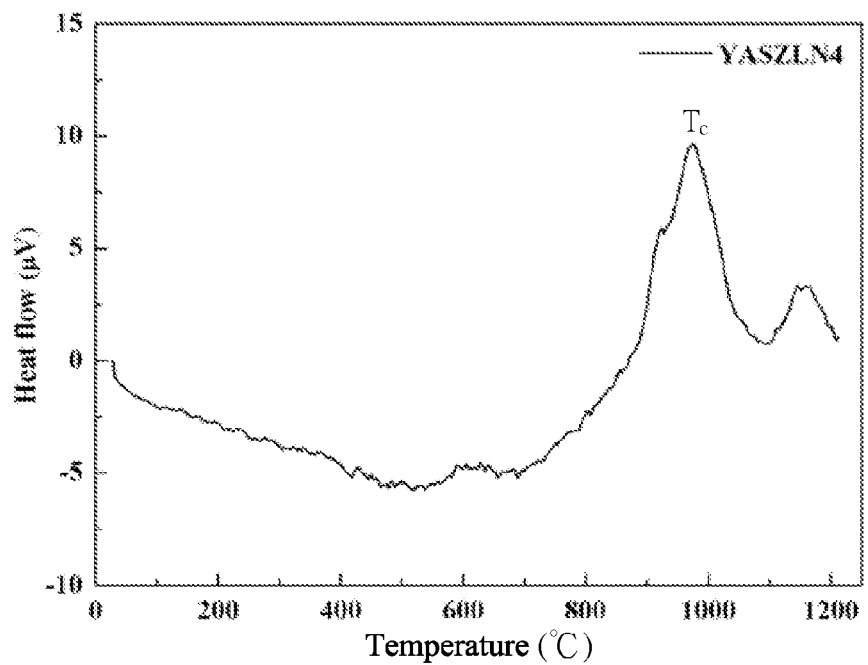

The aforementioned and other technical contents, features, and efficacies will be shown in the following detail descriptions of a preferred embodiment corresponding with the reference Figures.

A medium temperature solid oxide fuel cell glass packaging material adds at least one glass modifier to a glass main body. In one implementation, such glass modifier may be selected from $La_2O_3$, $Nd_2O_3$, $K_2O$, and NiO when the glass main body may be made of $SiO_2$, $Al_2O_3$, $Y_2O_3$ and ZnO. A method for manufacturing the glass packaging material will be described in further detail in below. Please turn the attention to the materials composing the glass main body first.

$SiO_2$ and $Al_2O_3$ may be the primary parts of the glass main body in terms of Mole percentage. Specifically, $SiO_2$ and $Al_2O_3$ may account for 45.0 to 65.0 mol % of the materials composing the glass main body and the glass modifier. Further, Si and Al may account for 20 to 50 wt % of the materials composing the glass main body and the glass modifier. In one implementation, $SiO_2$ and $Al_2O_3$ collectively may account for 45 mol %, 47.5 mol %, 50 mol %, 52.5 mol %, 55 mol %, 57.5 mol %, 60 mol %, 62.5 mol %, or 65 mol % (within the range between 45.0 and 65.0 mol %) of the materials composing the glass main body and the glass modifier. Similarly, Si and Al may account for 20 wt %, 25 wt %, 30 wt %, 35 wt %, 40 wt %, 45 wt %, or 50 wt % of the materials composing the glass main body and the glass modifier (within the range between 20 and 50 wt %).

$Y_2O_3$ may be used for adjusting the expansion coefficient of the glass main body. In one implementation, $Y_2O_3$ may account for 6.0 to 24.0 mol % of the materials composing the glass main body and the glass modifier. Y, meanwhile, may account for 10-45 wt % of the materials composing the glass main body and the glass modifier. Accordingly, $Y_2O_3$ may account for 6 mol %, 9 mol %, 12 mol %, 15 mol %, 18 mol %, 21 mol %, or 24 mol % of the materials composing the glass main body and the glass modifier so long as the mole percentage falls within the range from 6.0 to 24.0. the weight percentage of Y in the materials composing the glass main body and the glass modifier may be 10%, 15%, 20%, 25%, 30%, 40%, or even 45%.

ZnO may be used for adjusting the glass transition temperature, the softening point of the glass and the crystallization temperature of the glass, to adjust the melting point of the entire glass packaging material and enhance the fluidity of the same. ZnO may account for 10.0 to 25.0 mol % of the materials composing the glass main body and the glass modifier. Zn may account for 15 to 35 wt % of the materials composing the glass main body and the glass modifier. Thus, ZnO may be 10%, 12.5%, 15%, 17.5%, 20%, 22.5% or 25% in terms of Mole percentage of the materials composing the glass main body and the glass modifier. And Zn in terms of weight percentage may be 15%, 20%, 25%, 30%, or 35% of the materials composing the glass main body and the glass modifier.

The glass modifier may become necessary in order to adjust the glass transition temperature and the thermal expansion coefficient and improve the bonding characteristics. The glass modifier may be rare earth elements, alkaline metal elements or transitory elements. The application of $La_2O_3$, $Nd_2O_3$, $K_2O$, and NiO as the glass modifier will be described in below.

$La_2O_3$ may be used for adjusting the thermal expansion coefficient of the glass packaging material, and may account for 4.0 to 18.0 mol % of the materials composing the glass main body and the glass modifier. Further, La may account for 12 to 45% in weight percentage of the materials composing the glass main body and the glass modifier. Therefore, $La_2O_3$ may account for 4 mol %, 6 mol %, 8 mol %, 10 mol %, 12 mol %, 14 mol %, 16 mol % or 18 mol % of the materials composing the glass main body and the glass modifier. And La may account for 12 wt %, 15 wt %, 20 wt %, 25 wt %, 30 wt %, 35 wt %, 40 wt %, or 45 wt % of the materials composing the glass main body and the glass modifier.

$Nd_2O_3$ may be used to adjust the thermal expansion coefficient of the glass packaging material. $Nd_2O_3$ may also account for 4.0 to 18.0 mol % of the materials composing the glass main body and the glass modifier. Nd may account for 12 to 45% in weight percentage of the materials composing the glass main body and the glass modifier. Therefore, $Nd_2O_3$ may account for 4 mol %, 6 mol %, 8 mol %, 10 mol %, 12 mol %, 14 mol %, 16 mol % or 18 mol % of the materials composing the glass main body and the glass modifier. And Nd may account for 12 wt %, 15 wt %, 20 wt %, 25 wt %, 30 wt %, 35 wt %, 40 wt %, or 45 wt % of the materials composing the glass main body and the glass modifier.

NiO may be used to adjust the glass transition temperature and the bonding characteristics of the glass packaging material. NiO may also account for 4.0 to 18.0 mol % of the materials composing the glass main body and the glass modifier. Ni may account for 4 to 15% in weight percentage of the materials composing the glass main body and the glass modifier. Therefore, NiO may account for 4 mol %, 6 mol %, 8 mol %, 10 mol %, 12 mol %, 14 mol %, 16 mol % or 18 mol % of the materials composing the glass main body and the glass modifier. And Ni may account for 4 wt %, 6 wt %, 8 wt %, 10 wt %, 12 wt %, or 15 wt % of the materials composing the glass main body and the glass modifier.

The glass main body may be made of the commercially available material and its purity and particle size may be in compliance with and in reference to of specifications of industrial glass. As shown in FIG. 1, the glass packaging material may be categorized into YAS1-sys. (YASZL1 and YASZN1), YASK1-sys. (YASZLK1 and YASZNK1) and YASN1-sys. (YASZLN1 and YASZLN4). YASK1-sys.-based glass packaging material must be having $K_2O$ as the glass modifier when YASN1-sys.-based glass packaging material should be using NiO as the glass modifier. FIG. 1 also shows the compositions of the glass main body ($SiO_2$, $Al_2O_3$, $Y_2O_3$ and ZnO) and the glass modifier ($La_2O_3$, $Nd_2O_3$, $K_2O$, and NiO) in terms of Mole percentage of the YASN1-sys., YAS1-sys., and YASK1-sys.-based glass packaging material. Certain amount of the glass main body and the glass modifier corresponding to the respective Mole percentages may be prepared before being placed into a ball mill jar for milling for two hours. The mixed glass main body and the glass modifier may then be placed into an oven for baking so that the mixed glass main body and the glass modifier could be dried. The dried glass main body and the glass modifier may then be poured into 60-ml a platinum crucible, which may be put into a furnace for heating at 1550 to 1600 degrees Celsius for one hour. Resulting liquid in the crucible may be injected into a molding machine for quenching and forming a corresponding glass block. The quenched glass block may thereafter be placed into an annealing furnace to eliminate the stress. The annealed glass block may go through a powdering process by an automatic milling machine for 1 hour before XRD phase identification may be performed to ensure the combination of the glass main body and the glass modifier per Mole percentage could be resulting in the glass packaging material. A DTA analysis for analyzing the thermal properties of glass packaging material may be performed later. Some glass powder may be taken for the manufacturing of glass powder paste. Specifically, the glass powder may be mixed with 15.0 wt % PVA aqueous solution uniformly as the slurry until the viscosity of the same arrives at a level where the slurry becomes the paste before the glass packaging material could be placed at the locations where the packaging is needed.

FIGS. 2A to 2F show curves of thermal expansion coefficients of the glass packaging materials including YAS1-sys. (YASZL1 and YASZN1), YASK1-sys. (YASZLK1 and YASZNK1) and YASN1-sys. (YASZLN1 and YASZLN4).

As shown in those figures, the glass transition temperature (Tg) may be at where the slope of the curve significantly changes. The combination of the glass main body and the glass modifier may correspond to its thermal expansion coefficient (CTE, in terms of $10^{-6}$/Celsius), the glass transition temperature (Tg, in terms of Celsius) and the softening point temperature (Ts, in terms of Celsius) in FIG. 3. It could be shown in FIG. 3 that the glass transition temperatures of the combinations of the glass main bodies and glass modifiers may range from 740 to 768 degrees Celsius, with YASZLK1 associated with the lowest glass transition temperature ratio and YASZL1 associated with the highest transition temperature. As such, it may be concluded that the addition of $K_2O$ in the YASK1-sys.-based glass packaging material may effectively lower the glass transition temperature. The slope of the curve may stand for the thermal expansion coefficient, and YASZLN1 may be associated with the largest thermal expansion coefficient when YASZN1 may be associated with the lowest thermal expansion coefficient. Thus, the addition of $La_2O_3$ over the course of the preparation of the glass packaging material could be leading to the glass packaging material with the larger thermal expansion coefficient when compared with the glass packaging material having $Nd_2O_3$ added. Since $La_2O_3$ is better at disrupting the inherent glass network, the thermal expansion coefficient may increase, though the addition of $Nd_2O_3$ into $La_2O_3$ may also slightly increase the thermal expansion coefficient.

Figures 5, 6A:
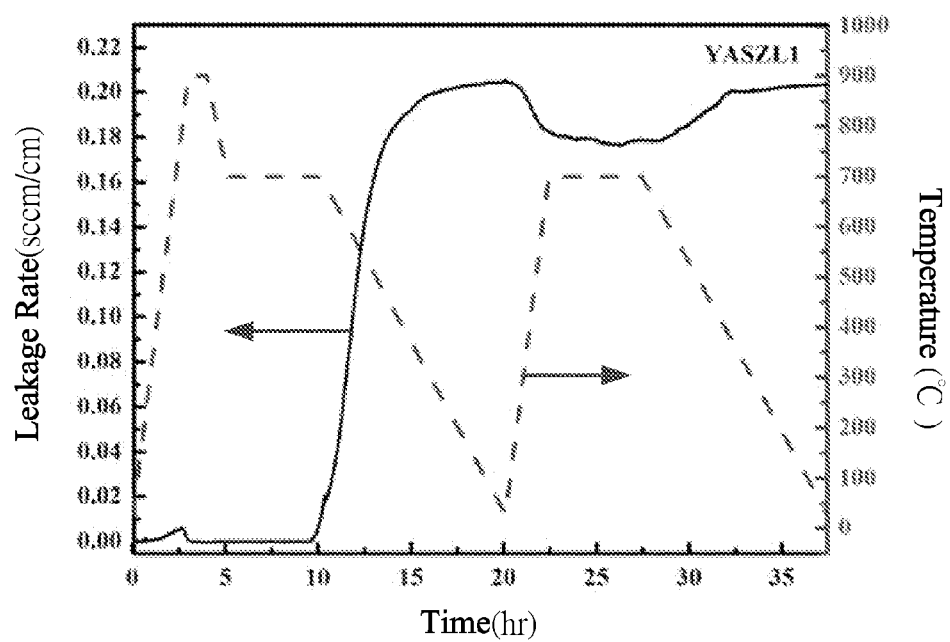
FIG. 5 show data of glass crystallization temperatures of the glass packaging materials of different combinations of the composing materials according to one embodiment of the present disclosure.
FIGS. 6A-6F show leakage rate measurements of the glass packaging materials of different combinations of the composing materials according to one embodiment of the present disclosure.
Figure 6B:
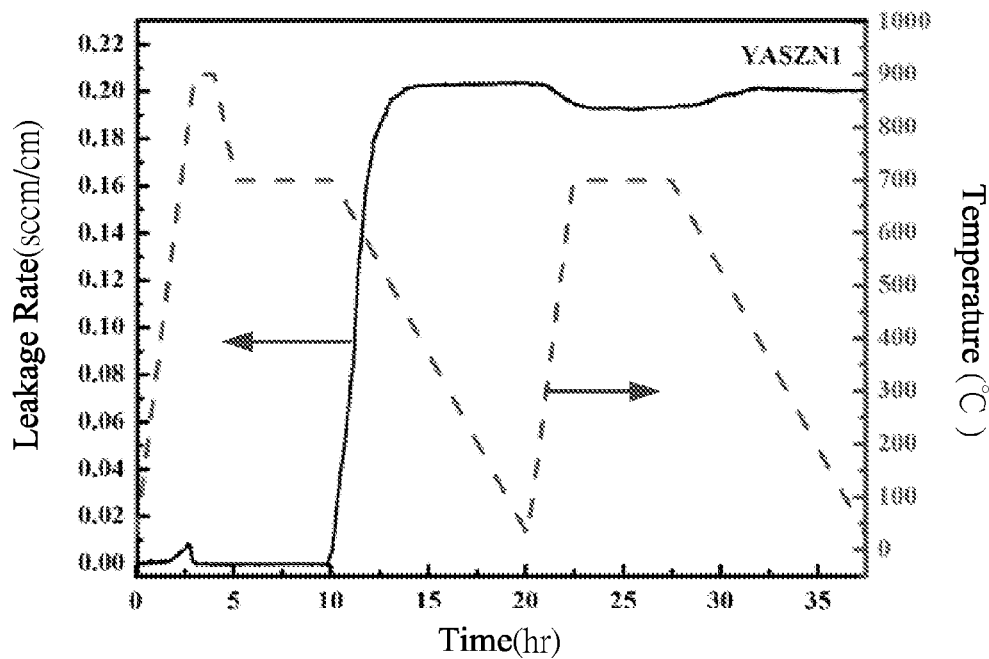
Figure 6C:
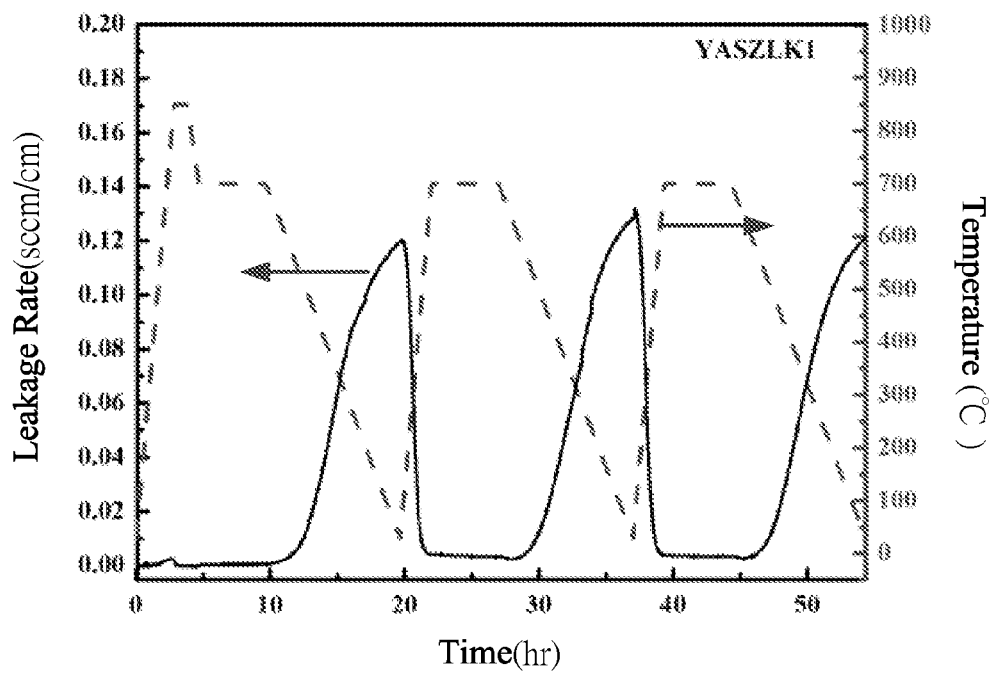
Figure 6D:
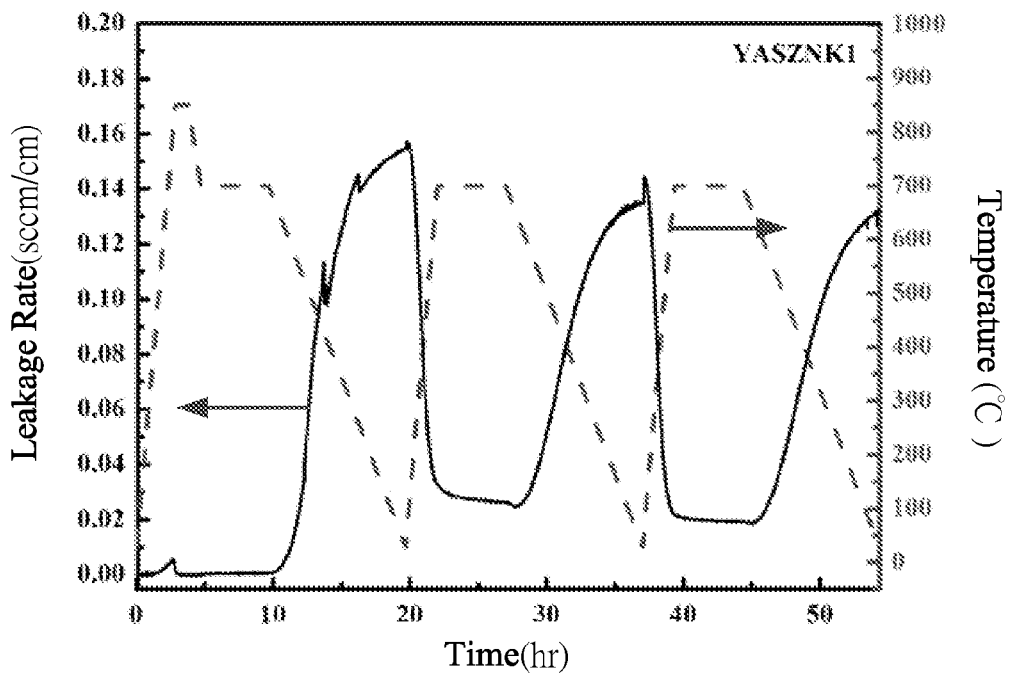
Figure 6E:
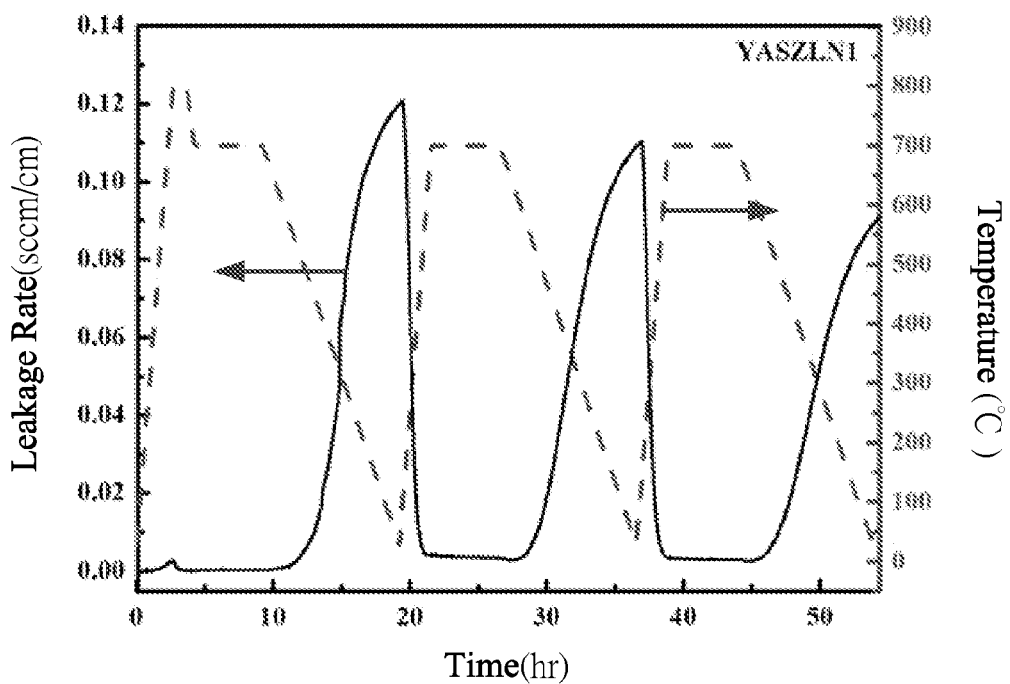
Figure 6F:
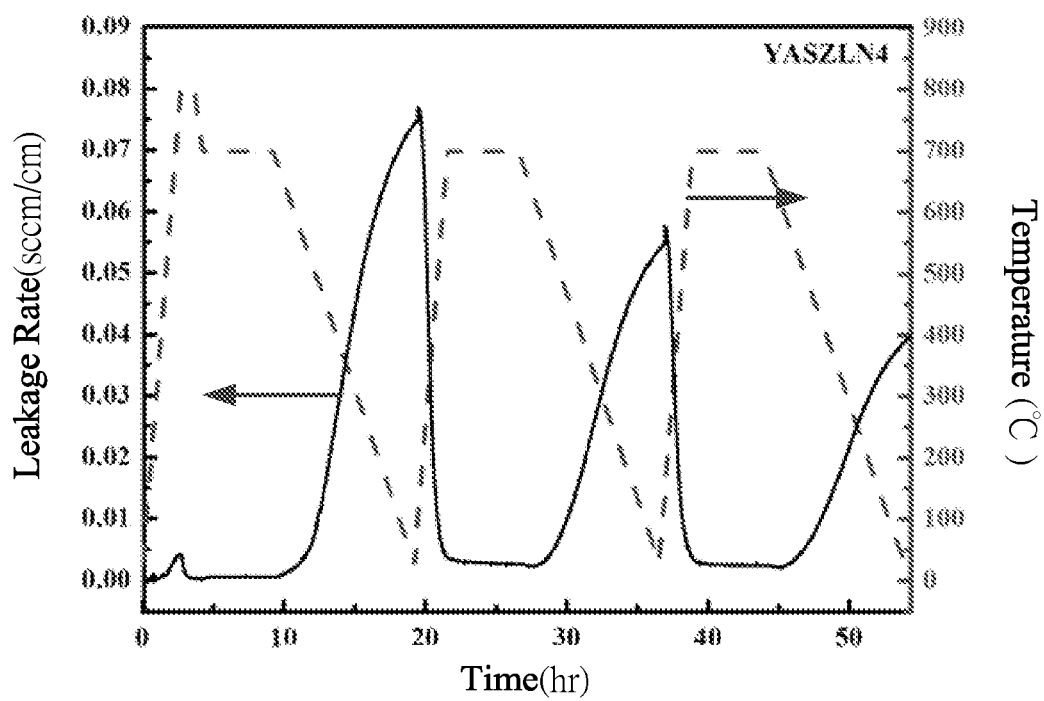

FIGS. 4A-4F show curves of glass differential thermal analysis (DTA). Heat dissipation may peak when the temperature increases according to the curves shown in above drawings. Where the heat dissipation peaks may be where the crystallization of the glass peaks, which may also correspond to the peak crystallization temperature (Tc, in terms of Celsius), as shown in FIG. 5. It could be inferred from FIG. 5 that in YASK1-sys.-based glass packaging material such as YASZLK1 and YASZNK1 the addition of $K_2O$ may present the characteristic of high temperature packaging at the range between 500 and 800 degrees as required in SOFC applications, while lowering the glass crystallization temperature. The glass crystallization temperature may affect thermal stability in the SOFC application. If the glass transition temperature is outside the 500-800-degree range for the SOFC applications, the glass crystallization may occur after the glass packaging material has been in use for the SOFC applications over the extended period of time. Such glass crystallization may cause the glass to lose its fluidity and downgrade the thermal stability of the same, which is usually avoided in application.

Thereafter, the glass packaging material may be made in the form of the paste before being used in packaging. The temperature may be raised to the bonding temperature for the bonding tasks, before being lowered back to 700 degrees Celsius for leakage rate measurements. The data collected in the process may be represented in a unified unit such as (sccm/cm). The leakage rate measurements in FIGS. 6A-6F suggest four glass packaging materials (YASZL1, YASZN1, YASZLN1, and YASZLN4) when mixed with PVA aqueous solution could be performing the bonding tasks as desired in the first cycle. However, YASZL1 and YASZN1-based glass packaging material without the addition of $K_2O$ may not pass the muster of the leakage rate requirement in the second cycle when failing to completely bond with stainless steel (SUS430) and YSZ. On the other hand, the addition of $K_2O$ and NiO does improve the performance in the bonding tasks as YASZLK1, YASZLN1 and YASZLN4 all satisfy the requirement of the leakage rate.

The materials composing the glass main body ($SiO_2$, $Al_2O_3$, $Y_2O_3$ and ZnO) and the materials used in the glass modifier ($La_2O_3$, $Nd_2O_3$, $K_2O$, and NiO) may come from oxides, metal hydroxides, carbonates, sulfates or nitrates. Some example formulas associated with metal hydroxides, carbonates and nitrates are presented in below:

The metal hydroxide of $SiO_2$ may come from: $Si(OH)_4 \rightarrow SiO_2 + 2H_2O$, when the carbonate of $SiO_2$ may come from: $Si(CO_3)_2 \rightarrow SiO_2 + 2CO_2$.

The metal hydroxide of $Al_2O_3$ may be derived from: $2Al(OH)_3 \rightarrow Al_2O_3 + 3H_2O$ when the carbonate of $Al_2O_3$ may be obtained from: $Al_2(CO_3)_3 + 3H_2O \rightarrow 2Al(OH)_3 + 3CO_2$, and the nitrate of $Al_2O_3$ could be from $4Al(NO_3)_2 \rightarrow 2Al_2O_3 + 4NO_2 + SO_2$.

For $Y_2O_3$, the metal hydroxide of $Y_2O_3$ may come from: $2Y(OH)_3 \rightarrow Y_2O_3 + 3H_2O$, and the nitrate of $Y_2O_3$ may be from: $2(Y(NO_3)_3 \cdot 6H_2O) \rightarrow Y_2O_3 + 6HNO_3 + 9H_2O$.

For ZnO, the metal hydroxide of ZnO may be from: $Zn(OH)_2 \rightarrow ZnO + H_2O$, the carbonates of ZnO may come from: $ZnCO_3 \rightarrow ZnO + CO_2$, and the nitrate of ZnO could be from: $2Zn(NO_3)_2 \rightarrow 2ZnO + 4NO_2 + O_2$.

Meanwhile, the metal hydroxide of $La_2O_3$ may be from $2La(OH)_3 \rightarrow La_2O_3 + 3H_2O$, the carbonates of $La_2O_3$ could be from $2La_3(CO_3)_2 \rightarrow 3La_2O_3+CO_2$, and the nitrate of $La_2O_3$ may be from $4La(NO_3)_2 \rightarrow 2La_2O_3+4NO_2+SO_2$.

Although the above examples show $SiO_2$, $Al_2O_3$, $Y_2O_3La_2O_3$, and ZnO may be from the metal hydroxides, carbonates or nitrates, the present disclosure is not necessarily limited as the result. Rather, any oxides, metal hydride oxides, carbonates, sulfates or nitrates that could provide $SiO_2$, $Al_2O_3$, $Y_2O_3$ and ZnO as the glass main body and $La_2O_3$, $Nd_2O_3$, $K_2O$, and NiO as the glass modifier may be used to practice the present invention disclosure.

The medium temperature solid oxide fuel cell glass packaging material when compared with conventional techniques has advantages:

(1) The medium temperature glass packaging material may be used in SOFC packaging applications under 700 degrees Celsius, with long-term thermal stability, not reacting to the components to be packaged, and capable of self-adjusting the thermal expansion coefficient to improve the matching and reducing the cracks; such glass packaging material may be even employed in any degree within the 500-800-degree range associated with the SOFC applications such as 500, 520, 540, 560, 580, 600, 620, 640, 660, 680, 700, 720, 740, 760, 780 or 800 degrees Celsius;

(2) The bonding characteristics of the glass packaging material may improve by having its thermal expansion coefficient adjusted because of the different combinations between the glass main body and the glass modifier while being superior at sealing and rarely generating poisons because of the reactions to the components to be packaged; and (3) The present invention glass packaging material is based on four low-cost glass main bodies to be associated with the relatively lowered transition temperatures, better sealing performance, and controllable thermal expansion coefficients, satisfying the needs in the current solid oxide fuel cell packaging.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A medium temperature solid oxide fuel cell glass packaging material without the addition of lead, boron, and alkaline earth elements, consisting of:
   a glass main body made of $SiO_2$, $Al_2O_3$, $Y_2O_3$ and ZnO; and
   at least one glass modifier added into the glass main body for manufacturing the glass packaging material, the at least one glass modifier is selected from the group consisting of $La_2O_3$, $Nd_2O_3$, and NiO;
   wherein a glass transition temperature ranges from 700 to 900 degrees Celsius;
   $SiO_2$, $Al_2O_3$, $Y_2O_3$ and ZnO are obtained from oxides, metal hydroxides, carbonates, sulfates or nitrates;
   $Y_2O_3$ is for adjusting an expansion coefficient of the glass main body, and accounts for 6.0 to 24.0 mol % of the glass packaging material;
   ZnO is for adjusting the glass transition temperature, a softening point and a glass crystallization temperature of the glass main body while accounting for 10.0 to 25.0 mol % of the glass packaging material;
   and
   the combined amount of $SiO_2$ and $Al_2O_3$ account for 45.0 to 65.0 mol % of the glass packaging material.

2. The glass packaging material according to claim 1, wherein the glass modifier is $La_2O_3$ for adjusting a thermal expansion coefficient of the glass packaging material and $La_2O_3$ accounts for 4.0 to 18.0 mol % of the glass packaging material.

3. The glass packaging material according to claim 2, where $La_2O_3$ is obtained from oxides, metal hydroxides, carbonates, sulfates or nitrates.

4. The glass packaging material according to claim 1, wherein the glass modifier is $Nd_2O_3$ for adjusting a thermal expansion coefficient of the glass packaging materials and $Nd_2O_3$ accounts for 4.0 to 18.0 mol % of the glass packaging material.

5. The glass packaging material according to claim 4, wherein $Nd_2O_3$ is obtained from oxides, metal hydroxides, carbonates, sulfates or nitrates.

6. The glass packaging material according to claim 1, wherein the glass modifier is NiO for adjusting the glass transition temperature and bonding characteristics of the glass packaging material, and NiO accounts for 4.0 to 18.0 mol % of the glass packaging material.

7. The glass packaging material according to claim 6, wherein NiO is obtained from oxides, metal hydroxides, carbonates, sulfates or nitrates.

* * * * *